US012774759B2

(12) United States Patent
Prentner et al.

(10) Patent No.: US 12,774,759 B2
(45) Date of Patent: Oct. 27, 2026

(54) VALVE

(71) Applicant: VAT Holding AG, Haag (CH)

(72) Inventors: Christian Prentner, Altach (AT); Emanuel Bach, Göfis (AT); Tamer Meseli, Mäder (AT); Felix Karu, Altach (AT); Ronald Pschenitschnigg, Rankweil (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 18/998,632

(22) PCT Filed: Jul. 7, 2023

(86) PCT No.: PCT/EP2023/068833

§ 371 (c)(1),
(2) Date: Jan. 27, 2025

(87) PCT Pub. No.: WO2024/022787

PCT Pub. Date: Feb. 1, 2024

(65) Prior Publication Data

US 2026/0043493 A1 Feb. 12, 2026

(30) Foreign Application Priority Data

Jul. 28, 2022 (DE) ......................... 102022119026.9

(51) Int. Cl.
*F16K 31/528* (2006.01)
*F16K 31/60* (2006.01)
*F16K 51/02* (2006.01)

(52) U.S. Cl.
CPC .......... *F16K 31/5286* (2013.01); *F16K 31/60* (2013.01); *F16K 51/02* (2013.01)

(58) Field of Classification Search
CPC ............................. F16K 31/5286; F16K 31/60
See application file for complete search history.

(56) References Cited

U.S. PATENT DOCUMENTS

| | | | | |
|---|---|---|---|---|
| 3,136,344 | A * | 6/1964 | Kollodge | F16L 37/20 141/382 |
| 6,390,158 | B2 * | 5/2002 | Johnston | F16K 35/025 141/386 |
| 7,011,294 | B1 | 3/2006 | Ehrne et al. | |
| 10,738,910 | B2 | 8/2020 | Steffen et al. | |
| 2001/0035229 | A1 | 11/2001 | Johnston | |
| 2015/0285396 | A1 | 10/2015 | Kienreich et al. | |
| 2018/0216739 | A1 | 8/2018 | Ehrne et al. | |

FOREIGN PATENT DOCUMENTS

| | | | |
|---|---|---|---|
| CN | 208919364 | U | 5/2019 |
| DE | 1201143 | B | 9/1965 |
| KR | 200387767 | Y1 | 6/2005 |

* cited by examiner

*Primary Examiner* — Michael R Reid
(74) *Attorney, Agent, or Firm* — Volpe Koenig

(57) ABSTRACT

A valve (1) having a valve rod (2) and a closure element (3), which is arranged on the valve rod (2), for closing a valve opening (4). The closure element (3) can be moved between a closing position and a maximum open position by the valve rod (2) solely in a linear manner in directions (5) that are parallel to the longitudinal extension (6) of the valve rod (2), and the valve (1) has a valve drive (7) with a handle (8) which can be actuated manually. The valve drive (7) has a valve drive housing (9) and at least one lever pair (10), and each lever pair (10) has a first lever (11) and a second lever (12).

15 Claims, 5 Drawing Sheets

VALVE

CROSS-REFERENCE TO RELATED APPLICATIONS

This application is a 371 National Phase of PCT/EP2023/068833. Filed Jul. 7, 2023, which claims priority from German Patent Application No. 10 2022 119 026.9, filed Jul. 28, 2022, both of which are incorporated herein by reference as if fully set forth.

TECHNICAL FIELD

The present invention relates to a valve, in particular a vacuum valve, comprising a valve rod and a preferably plate-shaped or wedge-shaped closure element, which is arranged on the valve rod, for closing a valve opening, wherein the closure element can be moved between a closing position, in which the closure element closes the valve opening, and a maximum open position, in which the closure element partially or completely opens the valve opening, by means of the valve rod solely in a linear manner in directions that are parallel to the longitudinal extension of the valve rod, and the valve has a valve drive with a handle which can be actuated manually for driving the valve rod to move the closure element between the closing position and the maximum open position.

BACKGROUND

Valves of this type are therefore those in which the valve drive can be actuated manually using the handle. They can also be referred to as manually operated valves. DE 1 201 143 shows an example of such a valve of this type in the form of a vacuum valve in which the closure element can be actuated manually with the aid of a lever. In addition, solutions are known, for example from US 2015/0285396 A1, in which a rotatable element allows the closure element to be actuated by hand by screwing.

SUMMARY

The object of the invention is to improve a valve of the type mentioned at the outset in such a way that it allows manual actuation that is as pleasant to the touch and reliable as possible.

For this purpose, the invention provides a valve having one or more of the features defined herein.

It is thus provided in accordance with the invention that the valve drive has a valve drive housing and at least one lever pair, preferably two lever pairs, wherein each lever pair has a first lever and a second lever, and the following is provided for each lever pair:

- the first lever is rotatably mounted on a first joint arranged fixedly on the valve drive housing and
- the first lever is rotatably connected to the second lever by means of a second joint and
- the second lever is rotatably connected to the valve rod by means of a third joint and
- the third joint is movably guided in a linear manner in at least one guide in or on the valve drive housing and
- the manually actuatable handle is located on the second lever.

Valves according to the invention with corresponding valve drives are distinguished by reliable actuation even with high lateral forces. They enable an optimum transmission ratio and a pleasant feel. Further advantages of valves according to the invention are precise repeat accuracy. Furthermore, valve drives according to the invention can be constructed with a small size and an attractive design. Both the first lever and the second lever can be straight, but also curved or angled, e.g., C-shaped or V-shaped. The latter can be used, for example, to minimize the overall size.

In addition, valve drives of valves according to the invention are characterized by excellent kinematics. With the same actuating speed at the handle, the valve drive can cause the closure element to move slowly, starting from the end positions and when reaching the end positions. In addition, a high speed of movement of the closure element in the middle range between the end positions can be achieved by means of valve drives designed according to the invention. All in all, this results in rapid opening and closing of the valve, wherein at the same time gentle contact of the sealing elements with the closure element or the valve seat as well as gentle closing and gentle compression of the seals between the closure element and the valve seat are made possible. However, when the end positions are reached, in particular when the closing position of the closure element is reached, high forces are simultaneously made available in order to securely close the valve opening. The overall result is significantly easier closing and opening while at the same time quickly bridging the middle actuation path.

The first, second and third joints are preferably designed as axial joints, particularly preferably as single-axis joints.

The valve opening can be formed in a valve housing of the valve, but also in a chamber opening or the like. The valve drive housing can be integrated into a valve housing or the valve housing of the valve or initially formed separately from it. If the latter is the case, the valve drive housing can have a mounting plate for attachment to the valve housing of the valve.

Valve drives of valves according to the invention can also be referred to as slider-crank mechanisms. In exemplary embodiments with two lever pairs, i.e., a total of four levers, reference can also be made to a four-member slider-crank mechanism or a four-lever slider-crank mechanism.

In principle, the guide on which the third joint is movably guided in a linear manner can be designed in various ways. For example, it can be a rail guide, a slotted guide or the like. However, preferred variants provide for the guide to be designed as a slot in a side wall of the valve drive housing and/or for the guide to be arranged parallel to the longitudinal extension of the valve rod. In order to further improve the ease of movement of the valve drive, preferred variants provide for the third joint to be slidably guided in the guide by means of a plastic slider. This enables almost frictionless, noiseless operation when opening and closing the valve.

In preferred variants of the invention, it is provided that the valve drive housing has a side wall on each of two opposite sides and all lever pairs are arranged in an intermediate space between the side walls, which intermediate space is open towards other sides. However, this does not exclude the possibility that in certain intermediate positions at least partial areas of the lever pairs may also protrude laterally from this intermediate space between the side walls. However, it is preferable that the levers and the handle are arranged completely inside the valve drive housing, or in other words are concealed, in a first end position, in which the closure element is in the closing position, and in a second end position, in which the closure element is in the maximum open position. On the one hand, this prevents the handle and thus the valve drive from being actuated accidentally or unintentionally. In addition, the side walls protect against open scissor action of the lever pairs and thus reduce the risk of injury, as the accidental trapping of fingers or the like of an operator is prevented.

Preferably, the first joint and the second joint are arranged at a distance from one another on the first lever. Particularly preferably, the first joint and the second joint are arranged at opposite ends of the first lever.

Furthermore, in preferred variants, it is also provided that the handle and the third joint on the second lever are arranged at a distance from one another, preferably at opposite ends of the second lever, and/or that the second joint on the second lever is formed in an area between the handle and the third joint. The second joint is advantageously located in a middle third of the second lever. Preferably, however, the distance of the second joint from the third joint is smaller than the distance between the second joint and the handle.

Preferably, an elastic element is arranged and/or acts between the third joint and the valve rod to compensate for tolerances. The elastic element can be a spring, in particular a helical spring, e.g., made of metal. On the one hand, the elastic element can be used to create a tolerance compensation. On the other hand, the elastic element can also be used to constantly ensure a sufficiently high contact pressure in the closing position of the closure element. In preferred variants, the elastic element is surrounded by a casing tube. The elastic element can be supported on an axle pin of the third joint. At the opposite end of the elastic element, this is preferably supported on the valve rod and in particular on a support plate of the valve rod. The elastic element is also advantageously arranged in the aforementioned intermediate space between the side walls of the valve drive housing.

In preferred embodiments of the invention, it is provided that a latching device, preferably designed as a spring-loaded detent pin, is arranged on the valve drive housing, into which latching device at least one of the levers automatically latches in an intermediate position between end positions of the at least one lever pair, wherein the closure element is in the closing position in a first of the end positions and in the maximum open position in a second of the end positions. On the one hand, this can provide a closure for the valve drive. However, the latching device can also serve to reduce the risk of injury, in particular by making two-handed operation of the valve drive necessary. For example, it may be necessary to operate the handle with one hand and the latching device with the other hand at the same time in order to bring the locking element into the closing position or into the open position.

Particularly preferred variants of the invention provide for a stop, preferably in the form of a stop bolt, to be provided on the valve drive housing, against which stop the lever pair strikes in one or the first end position, in which the closure element is in the closing position, and in one or the second end position, in which the closure element is in the maximum open position. The stop can thus form a system stop against which the lever pair strikes both in the maximum open position and in the closing position of the closure element. Ideally, the two levers of each lever pair together form a toggle lever, which is moved past a dead center in both end positions so that the valve drive is self-locking in both end positions.

In particularly preferred variants of the invention, the valve drive has exactly two lever pairs. The levers of the lever pairs are advantageously located in planes parallel to one another. All joint axes of the first, second and third joints are advantageously perpendicular to these planes in which the levers are arranged. The elastic element and also the valve rod are advantageously arranged between the levers of the lever pairs. The elastic element can be located in a casing tube. The axes of the third joints of the two lever pairs can be formed by a common axle pin. The elastic element can then be supported on the common axle pin. On the opposite side, the elastic element is then advantageously supported on the valve rod, in particular on a support plate of the valve rod.

The valves according to the invention are preferably vacuum valves. Vacuum valves are used in particular when working with pressure differences of less than or equal to 0.001 mbar (millibar) or 0.1 Pascal. However, vacuum valves can also be referred to when they are designed for pressure differences below normal pressure, i.e., below one bar.

BRIEF DESCRIPTION OF THE DRAWINGS

Further preferred features and details of the invention are explained by way of example using an exemplary embodiment according to the invention, in which.

DETAILED DESCRIPTION

Figure 1:
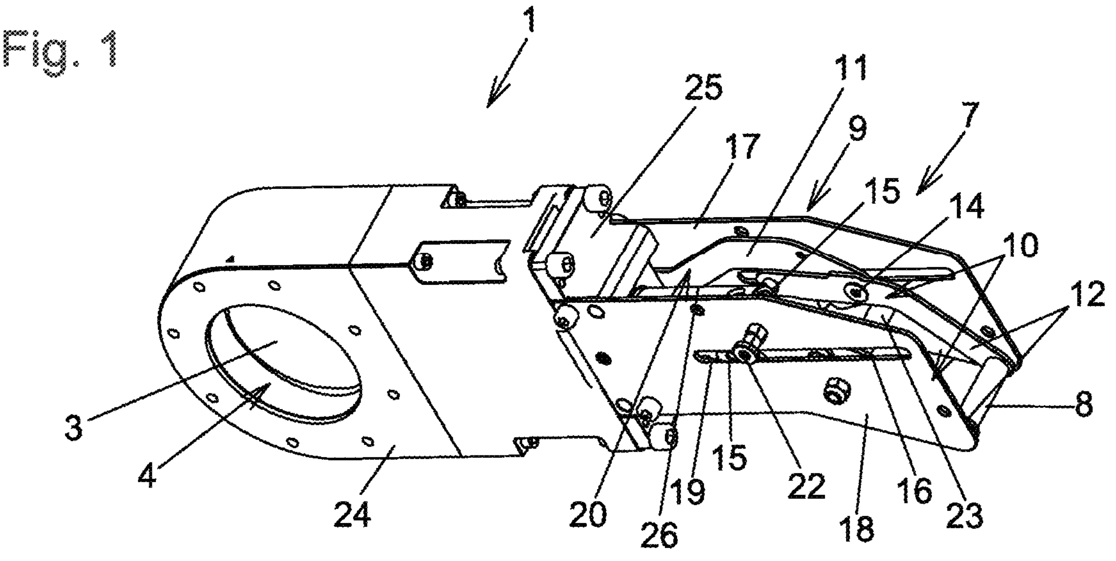
FIGS. 1 to 3 show perspective views from the outside of a valve according to the invention in the closing position, in a locked intermediate position and in the maximum open position of the closure element.
Figure 2:
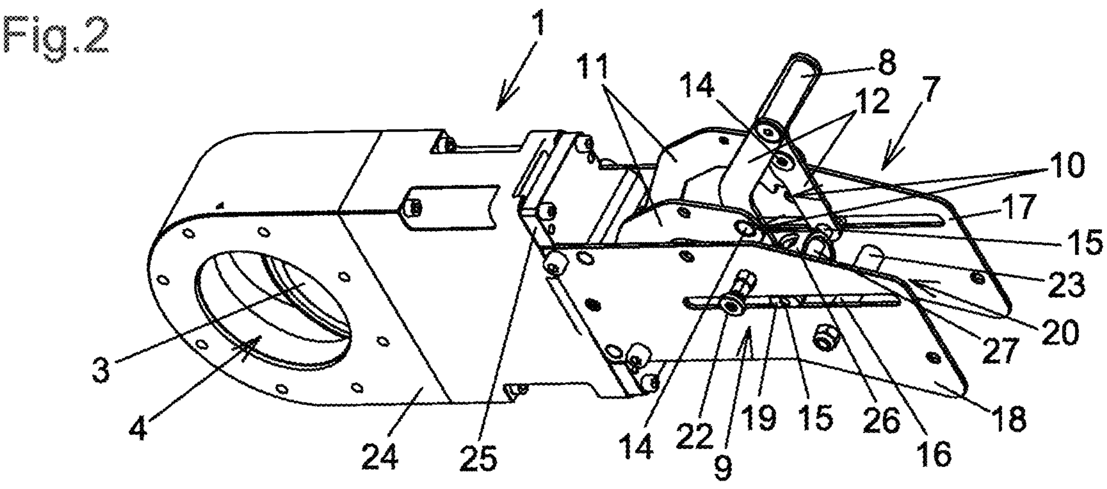
Figure 3:
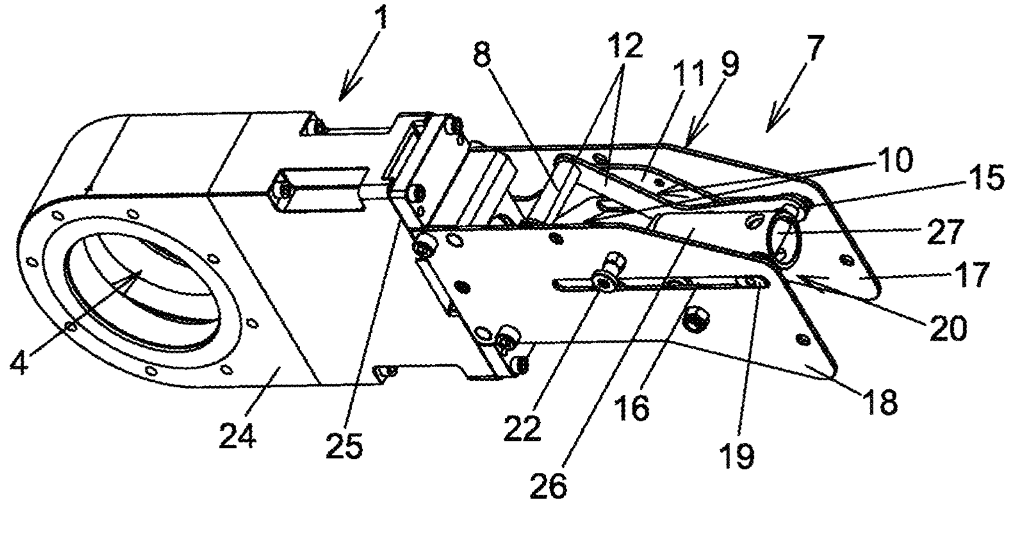

In FIG. 1, the valve 1 shown in a perspective view is in the closing position, in which the closure element 3 closes the valve opening 4. FIG. 2 shows the locked intermediate position and FIG. 3 shows the valve 1 in the open position of the closure element 3.

In this exemplary embodiment, the valve 1 has a valve housing 24 in which the valve opening 4 is formed. The valve opening 4 can be opened and closed by means of the closure element 3. In this exemplary embodiment, the valve drive housing 9 is attached to the valve housing 24 by means of a mounting plate 25. It has already been explained above that it is also possible for the valve housing 24 and the valve drive housing 9 to be integrated, i.e., to form a common housing. Furthermore, it has already been explained that the valve opening 4 does not necessarily have to be formed in the valve housing 24, but can also be formed as an opening in a process chamber, for example.

In this exemplary embodiment, in addition to the mounting plate 25, the valve drive housing 9 also has two side walls 17 and 18, which are spaced apart from one another and in this exemplary embodiment lie in planes parallel to one another. In addition to the valve drive housing 9, the valve drive 7 comprises two lever pairs 10 in this exemplary embodiment, each consisting of a first lever 11 and a second lever 12.

Figure 4:
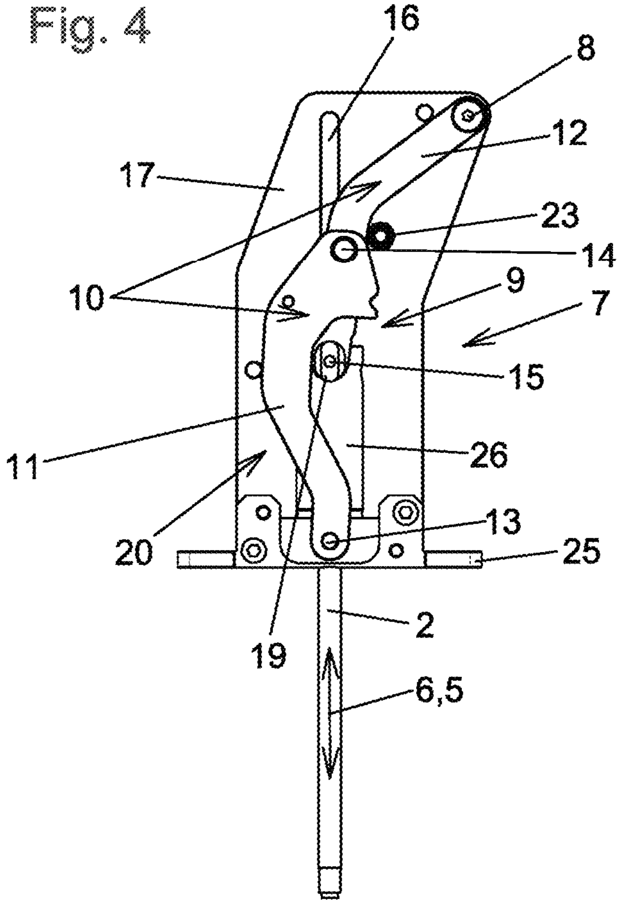
FIGS. 4 to 6 show representations of the valve drive with the side wall removed on one side in these three positions.
Figure 5:
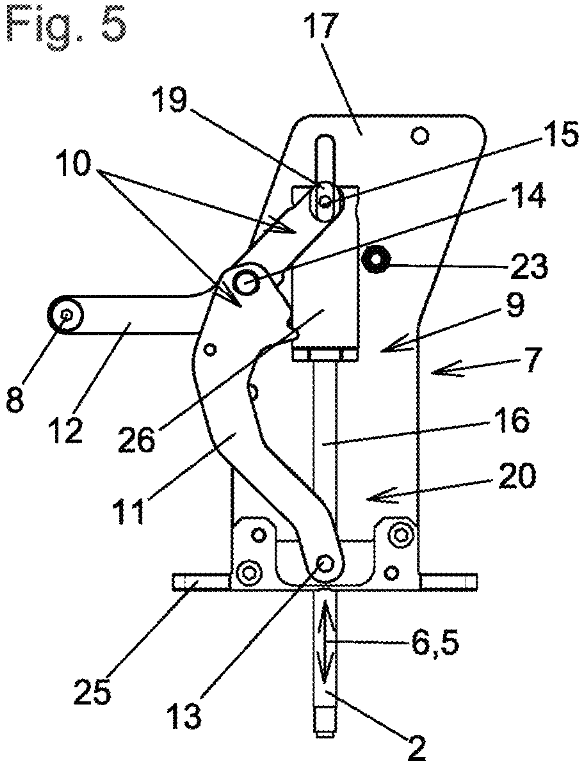
Figure 6:
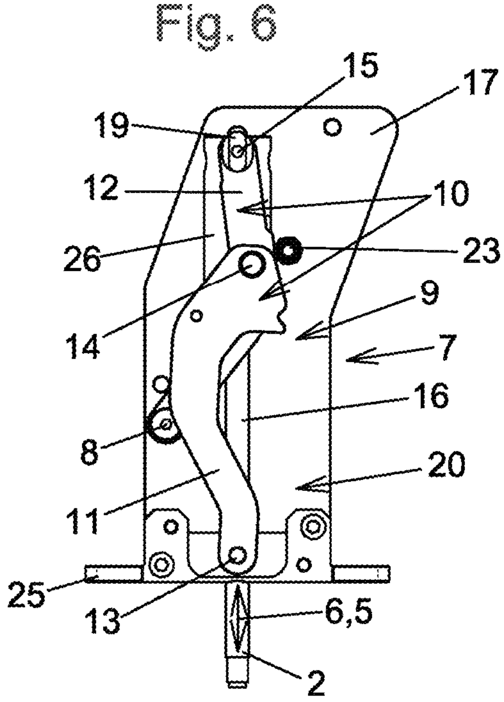

With regard to the arrangement and connection of these levers 11 and 12 of the lever pairs 10, reference is made in particular to FIGS. 4 to 6. All three of FIGS. 4 to 6 show the valve drive 7 of the valve 1 from FIGS. 1 to 3, wherein the side wall 18 of the valve drive housing 9 is not shown, however, and therefore the lever pair 10 arranged directly adjacent to the side wall 18, which is not shown, with its first, second and third joints 13, 14 and 15 can be clearly seen. The second lever pair 10 arranged in parallel planes is concealed behind the lever pair 10 visible in FIGS. 4 to 6, but is designed in a similar way.

FIGS. 4, 5 and 6 clearly show that the first lever 11 is rotatably mounted on a first joint 13 that is fixed to the valve drive housing 9. This first joint 13 is fixed in the sense that it is fixed to the valve drive housing 9, here in particular to the mounting plate 25. It can also be clearly seen that the first lever 11 is rotatably connected to the second lever 12 by means of the second joint 14 and the second lever 12 is rotatably connected to the valve rod 2 by means of the third joint 15. This connection of the second lever 12 to the valve rod 2 via the third joint 15 takes place here in the exemplary embodiment shown with the interposition of the elastic element 21, which is explained further below. However, it is just as conceivable that the second lever 12 is connected directly to the valve rod 2 by means of the third joint 15.

The third joint 15 is in any case movably guided in a linear manner in a guide 16 in the valve drive housing 9. In this exemplary embodiment, the guide 16 is formed in each of the side walls 17 and 18 as a slot. Preferably, as also provided here, the guide 16, here in the form of the respective slot, is arranged to run parallel to the longitudinal extension 6 of the valve rod 2. The directions 5 in which the valve rod 2 can be moved parallel to its longitudinal extension 6 are also shown in FIGS. 4 to 6. The manually actuatable handle 8 is arranged on the second lever 12. The valve drive 7 can be actuated manually by engaging the handle 8.

In FIGS. 4 to 6 it can also be clearly seen that the first joint 13 and the second joint 14 on the first lever 11 are spaced apart from one another and are specifically arranged here at opposite ends of the first lever 11. It can also be clearly seen that the handle 8 and the third joint 15 on the second lever 12 are spaced apart from one another, preferably again at opposite ends of the second lever 12. The second joint 14 is advantageously located, as also realized here, on the second lever 12 in a regio between the handle 8 and the third joint 15.

Even if the valve is designed here with two lever pairs 10, it is also possible for the valve drive 7 to have only a single lever pair 10 or more than two lever pairs 10. The first lever 11 and second lever 12 of the respective lever pair 10 can each be designed accordingly and connected to each other in an articulated manner.

FIG. 4 shows the valve drive 7 in the end position, which corresponds to the closing position of the closure element 3, which is not shown in FIG. 4 and is arranged on the valve rod 2. FIG. 6 shows the opposite end position, in which the closure element 3, which is also not shown here, is in the maximum open position. FIGS. 4 and 6 clearly show that the valve housing 9 has a stop 23, designed here as a stop bolt, against which stop the lever pairs 10 strike in the two end positions mentioned. In this respect, this stop 23 could also be referred to as a system stop. It provides the lever pairs 10 with defined end positions.

FIGS. 1 and 3 as well as 4 and 6 also clearly show that the levers 11 and 12 and the handle 8 are completely arranged or concealed within the drive housing 9 in the two end positions mentioned, in which the closure element 3 is either in the closing position or in the maximum open position. However, in the intermediate positions of the lever pairs 10 between these end positions, parts of the respective levers 11 and 12 can also protrude a little to the side out of the outwardly open intermediate space 20 between the side walls 17 and 18, as is clearly recognizable in FIGS. 2 and 5.

FIGS. 1 to 6 also show the plastic glides 19, with which the third joints 15 are each slidably guided in the respective guide 16. As explained above, these plastic glides 19 ensure largely friction-free guidance of the third joints 15 in the guides 16.

Figure 7:
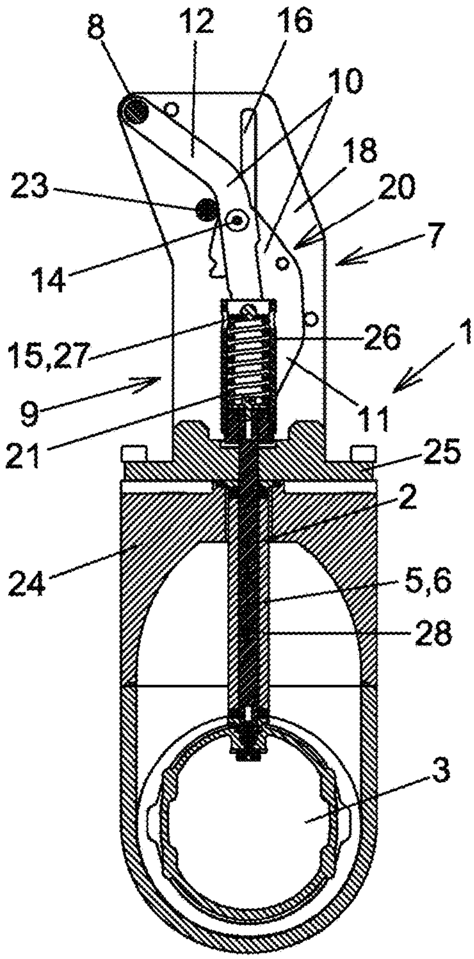
FIGS. 7 to 9 show representations of this exemplary embodiment in the closing position of the closure element.
Figure 8:
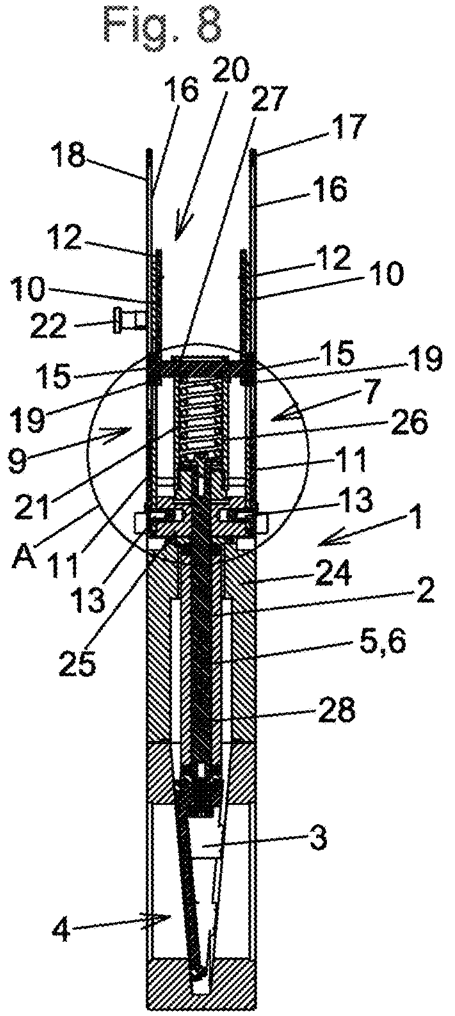

FIGS. 7 and 8 now show the valve 1 of this exemplary embodiment according to the invention in two mutually orthogonal longitudinal sections, wherein the closure element 3 is in each case in the closing position, in which it completely closes the valve opening 4 and rests against the valve seat in a sealed manner. It can be seen in FIG. 8 that the closure element 3 is a wedge-shaped closure element known per se. However, the closure element 3 can of course also be of a different design, e.g. plate-shaped. In the case of valves 1 according to the invention, it is in any case provided that the closure element 3 can be moved solely in a linear manner in directions 5 parallel to the longitudinal extension 6 of the valve rod 2 by means of the valve rod 2 and the valve drive 7. For sealing purposes, in this exemplary embodiment the valve rod 2 is also surrounded by a rod seal 28 known per se. Such rod seals are generally known for vacuum valves and need not be explained further.

For the sake of completeness, it should be noted that the valve 1 shown here is a vacuum valve. However, the invention can also be implemented in other valves.

Figure 9:
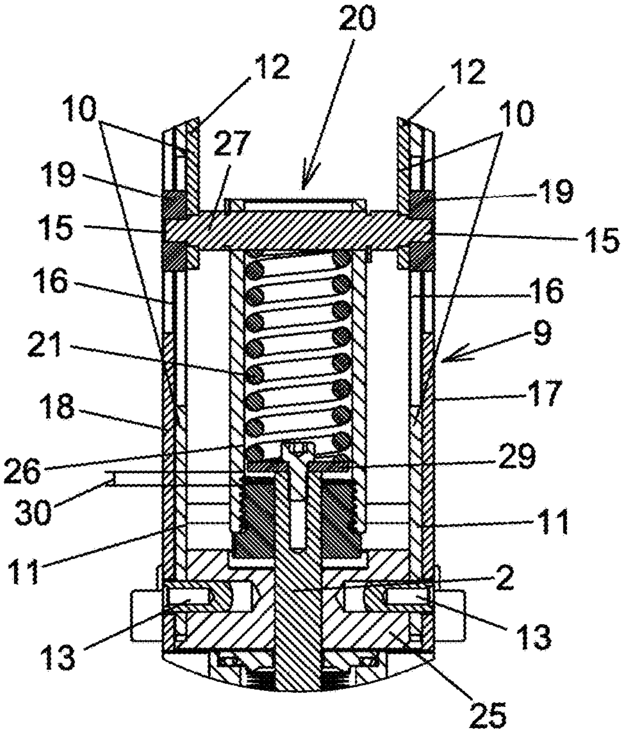

FIG. 7 clearly shows that the lever pair 10 shown is designed as a type of toggle lever, which is in a self-locking position in the end position shown here, in that the lever pair 10 has moved past a dead center and rests against the stop 23. In FIG. 8 and also in FIG. 9, which shows the region A from FIG. 8 enlarged, it can be clearly seen that the axes of the two third joints 15 of the two lever pairs 10 are formed by a common axle pin 27 in this exemplary embodiment. In the exemplary embodiment shown here, one end of the elastic element 21, which is designed as a coil spring and arranged inside the casing tube 26, is supported on this axle pin 27. At the opposite end, the elastic element 21 is supported on the valve rod 2 with the interposition of the support plate 29. Thus, as already explained above, the elastic element 21 serves to compensate for tolerances between the valve drive 7 and the valve rod 2. In addition, the elastic element 21 can also ensure that the closure element 3 always has sufficient pressure force in the closing position. In any case, it can be seen in FIG. 9 that in this end position, i.e., in the closing position of the closure element, the elastic element 21 is compressed to some extent, namely by the stroke 30 to be precise. If larger tolerances are to be compensated for, the stroke 30 is correspondingly larger, and correspondingly smaller for smaller tolerances. The casing tube 26 surrounds the elastic element 21, but would not necessarily have to be provided if the elastic element 21 were attached to the axle pin 27 or the support plate 29 in a different way.

Figure 12:
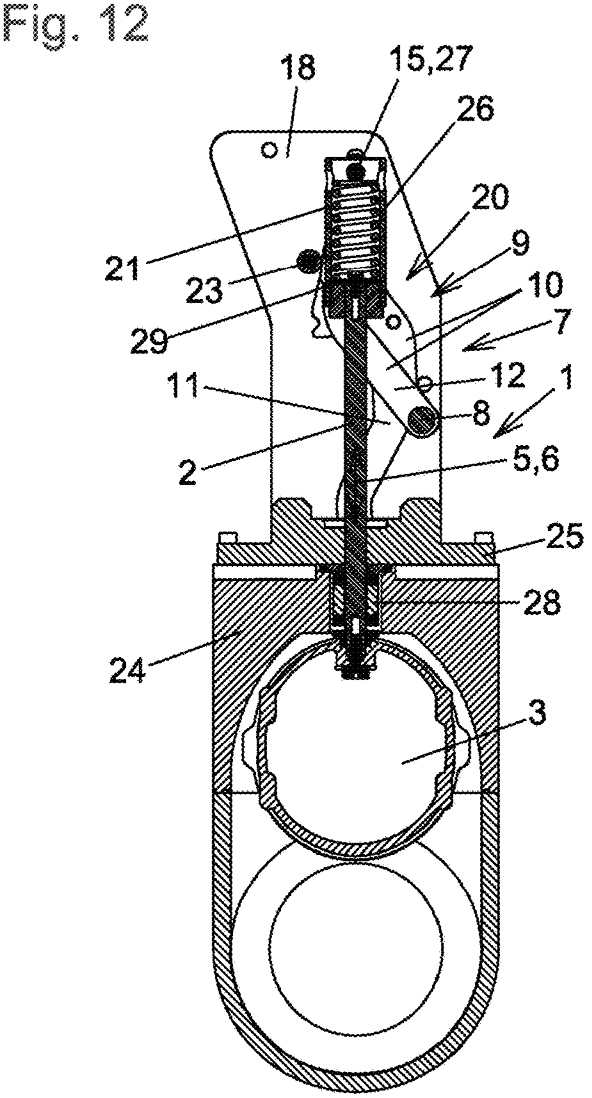
FIGS. 12 to 14 show representations of this exemplary embodiment in the open position of the closure element.
Figure 13:
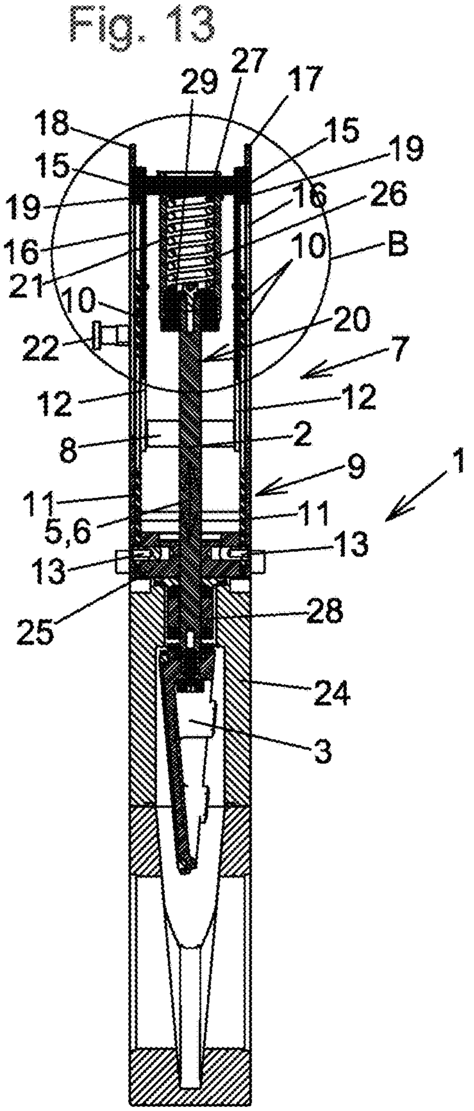
Figure 14:
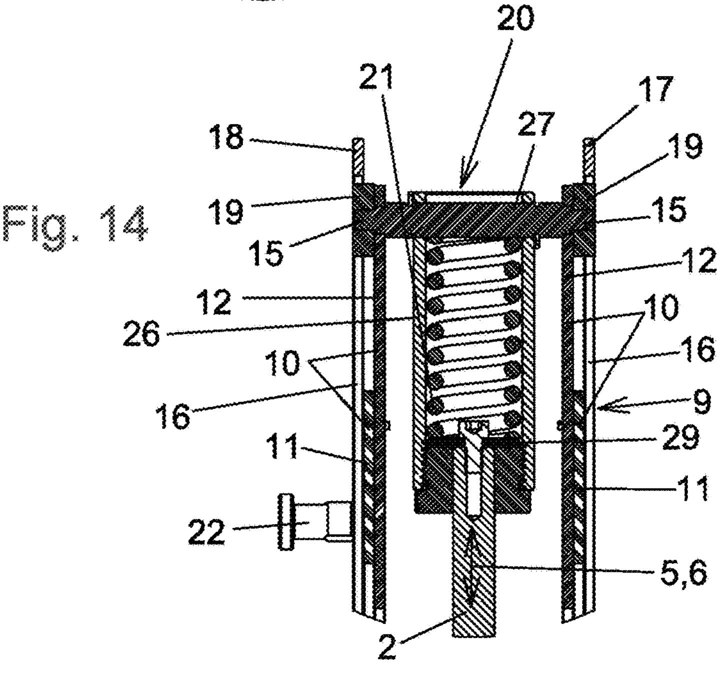

FIGS. 12, 13 and 14 show the corresponding representations in the other end position when the closure element 3 is in the maximum open position. FIG. 14 shows an enlarged view of the region B from FIG. 13. Here it is easy to see that the elastic element 21 is not compressed in this end position and thus there is no stroke 30.

FIGS. 7 and 12 also clearly show that the lever pairs 10 together with the handle 8 are arranged completely inside the valve drive housing 9 in the end positions mentioned.

In the end position shown in FIGS. 12 to 14, the toggle-lever-like lever pairs 10 are also in a self-locking position, having been moved past the dead center. Here too, they each rest against the stop 23.

Figure 10:
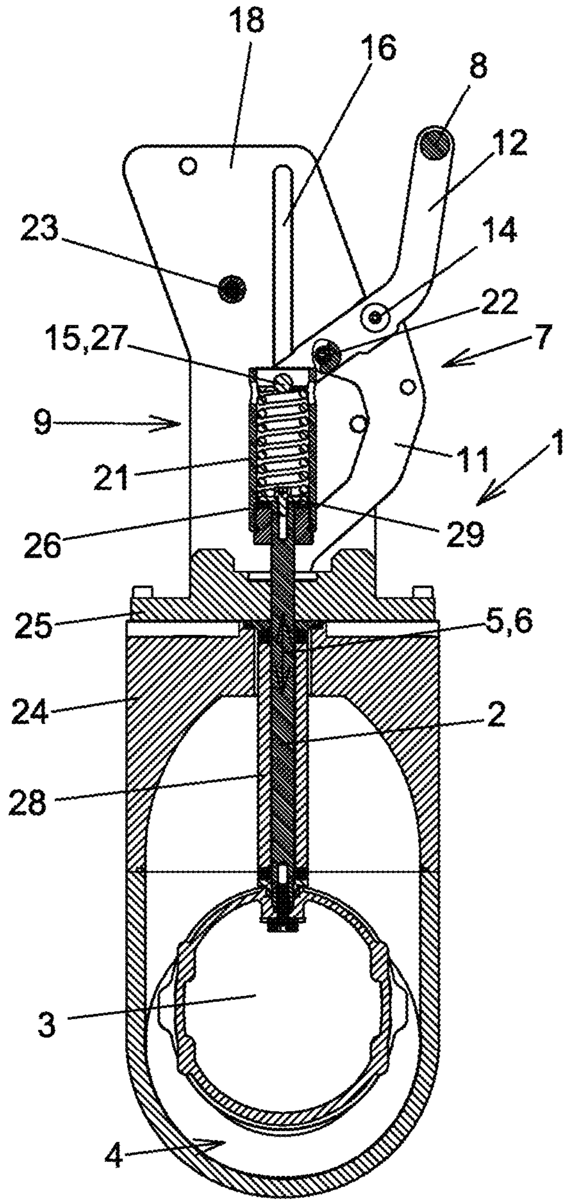
FIGS. 10 and 11 show representations of this exemplary embodiment in the locked intermediate position.
Figure 11:
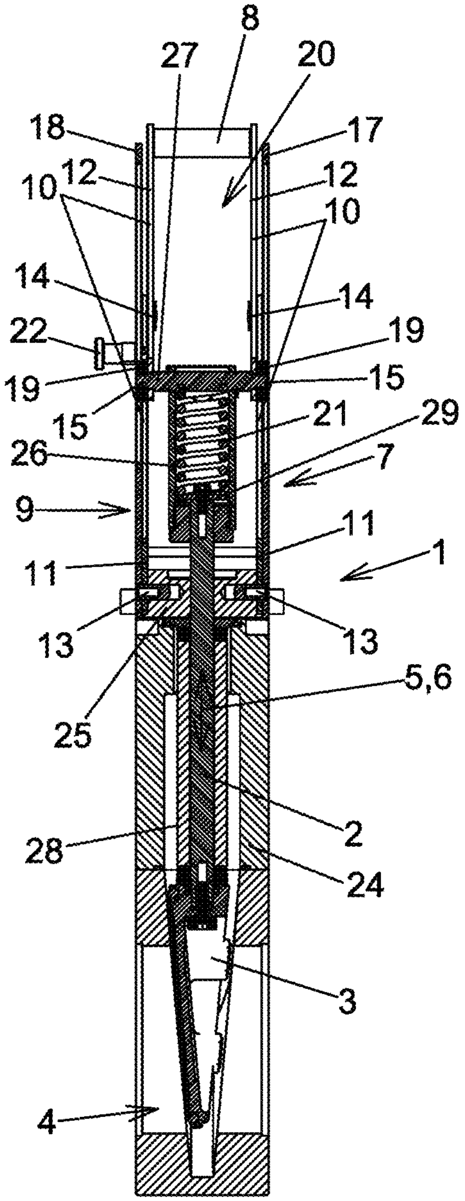

FIGS. 10 and 11 now also show an intermediate position of the lever drive 7 in the corresponding sectional views, in which at least one of the levers 11, 12 of the respective lever pair 10 is automatically engaged in a latching device 22 on the valve housing 9. The latching device 22 is a spring-loaded detent pin. The spring load ensures that the detent pin is always preloaded in the direction of the engaged state. In the exemplary embodiment shown, this latching device 22 engages in said intermediate position between the end positions in both levers 11 and 12 of the lever pair 10 arranged adjacent to the side wall 18. To release, the latching device 22 must be pulled with one hand, whereby the levers 11 and 12 of the lever pair 10 can be released and the valve drive 7 can be moved further in the direction of the respective end position. This is designed here so that two-handed operation is necessary. The latching device 22 must be actuated with one hand, while the handle 8 is actuated with the other hand in order to pivot the lever pairs 10 accordingly.

FIGS. 8, 11 and 13 clearly show that in this exemplary embodiment, the levers 11 and 12 of the respective lever pairs 10 are arranged in planes parallel to each other. The joint axes of the first, second and third joints 13, 14 and 15 are perpendicular to these planes. The elastic element 21 is located between the respective lever pairs 10, which is arranged in a casing tube 26 and is supported on one side on the common axle pin 27 and on the other side on the support plate 29 of the valve rod 2.

However, as already explained, this does not necessarily have to be the case. It is conceivable to design valve drives 7 according to the invention with only one lever pair 10, but also with more than two lever pairs 10. Variants without an elastic element 21 are also conceivable.

KEY TO THE REFERENCE NUMERALS

1 valve
2 valve rod
3 closure element
4 valve opening
5 direction
6 longitudinal extension
7 valve drive
8 handle
9 valve drive housing
10 lever pair
11 first lever
12 second lever
13 first joint
14 second joint
15 third joint
16 guide
17 side wall
18 side wall
19 plastic glides
20 intermediate space
21 elastic element
22 latching device
23 stop
24 valve housing
25 mounting plate
26 casing tube
27 axle pin
28 rod seal
29 support plate
30 stroke

The invention claimed is:

1. A valve, comprising:
- a valve rod and a closure element arranged on the valve rod for closing a valve opening, wherein the closure element is moveable between a closing position, in which the closure element closes the valve opening, and a maximum open position, in which the closure element partially or completely opens the valve opening, via the valve rod solely in a linear manner in directions a longitudinal extension of the valve rod;
- a valve drive with a handle which is manually actuatable for driving the valve rod to move the closure element between the closing position and the maximum open position;
- the valve drive having a valve drive housing and at least one lever pair, wherein each said lever pair has a first lever and a second lever, and for each said lever pair:
  - the first lever is rotatably mounted on a first joint arranged fixedly on the valve drive housing,
  - the first lever is rotatably connected to the second lever by a second joint,
  - the second lever is rotatably connected to the valve rod by a third joint,
  - the third joint is movably guided in a linear manner in at least one guide in or on the valve drive housing, and
  - the manually actuatable handle is located on the second lever.

2. The valve as claimed in claim 1, wherein at least one of the guide comprises a slot in a side wall of the valve drive housing, or the guide is arranged parallel to the longitudinal extension of the valve rod.

3. The valve as claimed in claim 1, wherein the third joint is movably guided in the guide by means of a plastic glide.

4. The valve as claimed in claim 1, wherein the valve drive housing has a side wall on each of two opposite sides and all of the lever pairs are arranged in an intermediate space between the side walls, and said intermediate space is open towards other sides.

5. The valve as claimed in claim 1, wherein the levers and the handle are concealed completely inside the valve drive housing in a first end position, in which the closure element is in the closing position, and in a second end position, in which the closure element is in the maximum open position.

6. The valve as claimed in claim 1, wherein t the first joint and the second joint are arranged at a distance from one another on the first lever.

7. The valve as claimed in claim 1, wherein the handle and the third joint on the second lever are arranged at a distance from one another.

8. The valve as claimed in claim 1, wherein an elastic element is arranged and/or acts between the third joint and the valve rod to compensate for tolerances.

9. The valve as claimed in claim 1, further comprising a latching device arranged on the valve drive housing, into which latching device at least one of the levers automatically latches in an intermediate position between end positions of the at least one lever pair, and the closure element is in the closing position in a first of the end positions and in the maximum open position in a second of the end positions.

10. The valve as claimed in claim 1, further comprising a stop formed on the valve drive housing, against which stop the lever pair strikes in a first end position, in which the closure element is in the closing position, and in a second end position, in which the closure element is in the maximum open position.

11. The valve as claimed in claim 6, wherein the first joint and the second joint are arranged at opposite ends of the first lever.

12. The valve as claimed in claim 1, wherein the handle and the third joint on the second lever are arranged on opposite ends of the second lever.

13. The valve as claimed in claim 1, wherein the second joint on the second lever is formed in an area between the handle and the third joint.

14. The valve as claimed in claim 9, wherein the latching device comprises a spring-loaded detent pin.

15. The valve as claimed in claim 10, wherein the stop comprises a stop bolt.

* * * * *